United States Patent [19]

Cooley

[11] Patent Number: 5,177,186
[45] Date of Patent: Jan. 5, 1993

[54] PROCESS FOR PREPARING POLYKETONES WITH APROTIC POLAR SOLVENT COMPRISING UP TO 0.5% BY WEIGHT WATER

[75] Inventor: Neil A. Cooley, Middlesex, England

[73] Assignee: The British Petroleum Company, p.l.c., London, England

[21] Appl. No.: 762,618

[22] Filed: Sep. 19, 1991

[30] Foreign Application Priority Data

Sep. 26, 1990 [GB] United Kingdom ............... 9020976

[51] Int. Cl.$^5$ .............................................. C08G 67/02
[52] U.S. Cl. .................................................... 528/392
[58] Field of Search ........................................ 528/392

[56] References Cited

FOREIGN PATENT DOCUMENTS 0361623  4/1990  European Pat. Off. ............ 528/392

*Primary Examiner*—Harold D. Anderson
*Attorney, Agent, or Firm*—Brooks, Haidt, Haffner & Delahunty

[57] ABSTRACT

A process for preparing terpolymer polyketones comprises reacting at least two olefins with carbon monoxide at elevated temperature and pressure in the presence of a catalyst prepared from (a) a source of palladium, (b) a source of an anion which either does not coordinate with palladium or is less strongly coordinating to palladium than both carbon monoxide and the olefin(s) used and (c) a bisphosphine of formula $(R^1)_2P-R-P(R^1)_2$ wherein $R^1$ is an optionally polar substituted aromatic hydrocarbyl group and R is a divalent organic bridging group of formula $-(CH_2)_n-$ where $n=2$ to 8 and (d) a 1,4 quinone. The process is characterized by being carried out in a solvent comprising a mixture of an aprotic polar solvent and from 0.0001 to 0.5% by weight water. The particular solvent system used is especially useful for preparing terpolymer polyketones of high molecular weight.

5 Claims, No Drawings

PROCESS FOR PREPARING POLYKETONES WITH APROTIC POLAR SOLVENT COMPRISING UP TO 0.5% BY WEIGHT WATER

The present invention relates to a process for preparing polyketones by reacting at least two olefins with carbon monoxide in the presence of a palladium catalyst in a polar aprotic solvent. Such polyketones are useful in the manufacture of containers and packaging material and as additives to more conventional polymers such as polyethylene.

European patent application 361623 teaches that polyketones, i.e. linear alternating copolymers of one or more olefins and carbon monoxide, can be prepared by reacting the olefin(s) with carbon monoxide in the presence of a catalyst composition derived from (a) a palladium compound, (b) an anion of certain acids having a pKa of less than 4 and (c) a bisphosphine having the general formula $(R^1)_2P-R-P(R^1)_2$ wherein $R^1$ is an optionally polar-substituted aromatic hydrocarbyl group and R is a bivalent bridging group containing at least two carbon atoms in the bridge. The process is characterised by being carried out in the presence of a mixture of one or more aprotic polar liquids including inter alia THF and less than 50% by volume water. According to the patent application, it is most preferred to employ mixtures containing from 5 to 15% by volume water.

European patents 390237, 384517 and 376364 also teach the use of cyclic ethers, e.g. THF, as solvents but only in mixtures with a lower aliphatic alcohol such as methanol.

U.S. Pat. Nos. 4,940,776 and 4,916,208, EP 357101 and EP 51023 all mention in passing that ketones can be used. However there is no mention of the criticality of water.

Finally a number of references teach the use of solvent mixtures comprising a lower aliphatic alcohol and a ketone such as acetone and methyl ethyl ketone (see for example U.S. Pat. Nos. 4,882,417 and 4,914,184).

It has now been found that contrary to the teaching in EP 361623 when an aprotic polar solvent is used to prepare terpolymer ketones the yields are poor unless only small amounts of water, i.e. less than 0.5% by weight are present.

According to the present invention there is provided a process for preparing terpolymer polyketones which comprises reacting at least two olefins with carbon monoxide at elevated temperature and pressure in the presence of a catalyst prepared from (a) a source of palladium, (b) a source of an anion which either does not coordinate with palladium or is less strongly coordinating to palladium than both carbon monoxide and the olefin(s) used and (c) a bisphosphine of formula $(R^1)_2P-R-P(R^1)_2$ wherein $R^1$ is an optionally polar substituted aromatic hydrocarbyl group and R is a divalent organic bridging group of formula $-(CH_2)_n-$ where n=2 to 8 and (d) a 1,4 quinone characterised in that the reaction is carried out in a solvent comprising a mixture of an aprotic polar solvent and from 0.0001 to 0.5% by weight water.

Olefins which can suitably be reacted with the carbon monoxide include ethylene, propylene, $C_4$ to $C_{10}$ alpha olefins, styrene and alkyl substituted styrenes. Preferred olefins are ethylene, propylene, but-1-ene, pent-1-ene, 2 methylpent-1-ene, hex-1-ene and styrene. Particularly preferred is the use of mixtures of ethylene and either propylene or a $C_4$ to $C_6$ alpha olefin.

By the term terpolymer polyketone is meant a linear alternating polymer of olefin and CO units prepared by reacting at least two of the olefins defined above with carbon monoxide under the reaction conditions described below. It is particularly preferred that the process of the present invention is used to prepare terpolymer polyketones in at which at least 70 mole % of the olefin units are ethylene most preferably at least 80 mole %. Such compositions can be achieved by a adjusting the relative proportions of olefins used as feedstock as is necessary.

The purity of the carbon monoxide is not especially critical although it is preferred that it contains less than 20% by volume of hydrogen gas.

Turning to the catalyst, whilst it is believed that the source of palladium is not critical it is preferred to use a palladium carboxylate salt e.g. palladium acetate, palladium propionate or palladium acetoacetonate. Sources of palladium containing strongly coordinating anions or ligands, e.g. palladium halides, can be used as precursors provided that the strongly coordinating anions or ligands are removed from the catalyst composition before use.

Component (b) of the catalyst composition is an anion which either does not coordinate to palladium or coordinates less strongly to palladium than both carbon monoxide and the olefin(s) used in the process. Typical examples of such anions are (1) the conjugate bases of acids having a pKa of less than 4 as measured at 25° C. in water with the exception of hydrogen halides (EP 121965) or (2) those anions disclosed in EP 314309. Examples of suitable anions include para-toluenesulphonate, trifluoroacetate, difluoroacetate, tetafluoroborate and borate anions of the type described in EP 314309.

The bisphosphine, which forms component (c) of the catalyst composition, has the formula $(R^1)_2P-R-P(R^1)_2$ wherein the $R^1$ groups are independently optionally polar substituted aromatic hydrocarbyl groups and R is a divalent bridging group of formula $-(CH_2)_n-$ where n=2 to 8. Preferred bisphosphines are those of formula $(Ph)_2P-(CH_2)_m-P(Ph)_2$ were Ph=phenyl and m=2 to 6 or corresponding compounds where one or more of the phenyl groups are $C_1$ to $C_4$ alkoxy substituted. Most preferred bisphosphines are those having the formula given above where m=2 to 4.

The catalyst employed in the process of the present invention can be generated in situ under the reaction conditions by charging sources of the three components to the polymerisation reactor. Alternatively the three components can be used to prepare precursor palladium complexes of formula $ZPd(Q)_2^{2+}2X^-$ beforehand. In this formula Z is the bisphosphine referred to above, X is the non- or weakly coordinating anion corresponding to component (b) above and Q is a weakly coordinating ligand such as a nitrile.

If the catalyst is to be prepared in situ in the polymerisation reactor then it is preferred that the molar ratio of bisphosphine to palladium charged is in the range 0.8:1 to 1.5:1 whilst the ratio of anion to palladium is in the range 2:1 to 20:1 preferably 2:1 to 4:1. Irrespective of how the catalyst is prepared it is preferred that the molar ratio of palladium to total olefins to be polymerised is in the range $10^{-7}$ to 1 to $10^{-3}$ to 1 under the reaction conditions.

The palladium catalyst defined above is further activated by the addition of from 5 to 5000 moles of a 1,4-quinone per mole of palladium. Most preferred 1,4 quinones are 1,4-benzoquinone and 1,4-napthaquinones. It is preferred that the molar ratio of 1,4-quinone to water in the solvent is in the range 1:5 to 10:1.

It is a feature of the process of the present invention that polymerisation is carried out in an aprotic polar solvent containing only small but nonetheless finite amounts of water. The amount of water should be in the range 0.0001% to 0.5% by weight of the total weight of the aprotic polar solvent employed since if more water is present the yield of polyketone is reduced. It is preferred that the amount of water used is in the range 0.005 to 0.2% by weight in order to achieve the best results.

The aprotic polar solvent is suitably one or more solvents selected from the group consisting of $C_3$ to $C_{10}$ ketones, $C_2$ to $C_{10}$ acyclic ethers, $C_4$ to $C_{12}$ cyclic ethers and $C_6$ to $C_{10}$ aromatics. Chlorinated aliphatic and aromatic solvents having up to 10 carbon atoms can also be used. Preferred examples of solvents include tetrahydrofuran, acetone and 1,4-dioxane.

The process of the present invention is suitably carried out by feeding one or more liquid streams, which in total comprise (1) the components for generating the catalyst or the independently prepared precursor palladium complex, (2) the solvent and (3) any liquid olefin(s) employed, to a polymerisation reactor together with gaseous streams in total comprising carbon monoxide and any gaseous olefin(s) used. The polymerisation reactor is suitably maintained at a temperature in the range 20° to 120° C. preferably 30° to 100° C. and at a pressure in the range 20 to 150 bars preferably 20 to 80 bars. It is preferred that the molar ratio of total olefins to carbon monoxide in the polymerisation reactor is in the range 2:1 to 1:2. The polymerisation reactor can be operated either batchwise or continuously.

The terpolymer polyketone produced by the process defined above can be removed from the polymerisation reactor, separated from the reactionmedium by filtration and washed with any suitable solvent, e.g. THF, methanol or acetone, in which it is not soluble.

It is a further feature of the present invention that the terpolymer polyketones produced by the above-mentioned process have higher melting points and intrinsic viscosities than those products prepared using conventional protic solvents such as alcohols and the like. In other words the process of the present invention is especially useful for preparing terpolymer polyketones of high molecular weight.

The present invention is now illustrated by the following Examples.

EXAMPLE 1

A carbon monoxide/ethylene/propylene terpolymer polyketone was prepared by the following method.

The precursor palladium complex $[Pd(dppp)(PhCN)_2](BF_4)_2$ (0.0163 g, 0.018 mmol), together with 1,4-benzoquinone (0.3505 g, 3.25 mmol), propylene (27.3 g, 0.65 mol) and THF (100 cm$^3$, 0.01% w/w $H_2O$) were mixed in a 300 cm$^3$ mechanically stirred autoclave. An equimolar mixture of ethylene and carbon monoxide was introduced such that the overall pressure was 30 bar g at ambient temperature. The contents of the autoclave were brought to 70° C. and the overall pressure was adjusted to 50 bar g. These conditions were maintained for four hours by addition of more of the gaseous mixture as appropriate. The polymerisation reaction was terminated by releasing the pressure. The polymer produced was collected by filtration, washed with methanol and acetone and dried in vacuo.

A yield of 21.21 g of terpolymer polyketone was obtained (melting point 219°-221° C. and intrinsic viscosity 3.3 dlg$^{-1}$).

COMPARATIVE TEST A

A carbon monoxide/ethylene/propylene terpolymer polyketone was prepared as in Example 1 except that methanol (100 cm$^3$, 0.01% w/w $H_2O$) was used in place of THF.

A yield of 2.21 g of terpolymer polyketone was obtained (melting point 173°-175° C. and intrinsic viscosity 0.4 dlg$^{-1}$).

EXAMPLE 2

A carbon monoxide/ethylene/propylene terpolymer polyketone was prepared as in Example 1 except that 1,4-dioxane (100 cm$^3$, 0.02% w/w $H_2O$) was used in place of THF.

A yield of 4.49 g of terpolymer polyketone was obtained (melting point 204°-210° C. and intrinsic viscosity 3.1 dlg$^{-1}$).

EXAMPLE 3

A carbon monoxide/ethylene/propylene terpolymer polyketone was prepared as in Example 1 except that 0.040 mmol of $[Pd(dppp)(PhCN)_2](BF_4)_2$ was employed and the water content of the THF was 0.06% w/w.

A yield of 33.00 g of terpolymer polyketone was obtained (melting point 213°-217° C. and intrinsic viscosity 2.6 dlg$^{-1}$).

EXAMPLE 4

A carbon monoxide/ethylene/propylene terpolymer polyketone was prepared as in Example 1 except that the water content of the THF was 0.1% w/w. A yield of terpolymer polyketone was 6.58 grams (melting point 210°-215° C.).

COMPARATIVE TEST B

A carbon monoxide/ethylene/propylene terpolymer polyketone was prepared as in Example 1 except that the water content of the THF was 0.56% w/w. The yield of terpolymer polyketone was only 0.26 g (melting point 208°-216° C.).

I claim:

1. A process for preparing terpolymer polyketones which comprises reacting at least two olefins with carbon monoxide at elevated temperature and pressure in the presence of a catalyst prepared from (a) a source of palladium, (b) a source of an anion which either does not coordinate with palladium or is less strongly coordinating to palladium than both carbon monoxide and the olefin(s) reacted and (c) a bisphosphine of formula $(R^1)_2P—R—P(R^1)_2$ wherein $R^1$ is an optionally polar substituted aromatic hydrocarbyl group and R is a divalent organic bridging group of formula—$(CH_2)_n$—where n=2 to 8, (d) a 1,4 quinone and (e) a solvent comprising a mixture of an aprotic polar solvent and from 0.0001 to 0.5% by weight water.

2. A process as claimed in claim 1 wherein the amount of water is in the range 0.005 to 0.2% by weight.

3. A process as claimed in claim 1 wherein the aprotic polar solvent is selected from tetrahydrofuran, acetone or dioxane.

4. A process as claimed in claim 1 wherein the two olefins comprise ethylene and propylene.

5. A process as claimed in claim 1 wherein the molar ratio of total olefins to carbon monoxide is in the range 2:1 to 1:2.

* * * * *